United States Patent [19]
Webb

[11] Patent Number: 6,055,099
[45] Date of Patent: Apr. 25, 2000

[54] OPTICAL INTERCONNECT

[75] Inventor: Roderick P Webb, Woodbridge, United Kingdom

[73] Assignee: British Telecommunications public limited company, London, United Kingdom

[21] Appl. No.: 09/051,538

[22] PCT Filed: Feb. 14, 1997

[86] PCT No.: PCT/GB97/00430

§ 371 Date: Apr. 13, 1998

§ 102(e) Date: Apr. 13, 1998

[87] PCT Pub. No.: WO97/31280

PCT Pub. Date: Aug. 28, 1997

[30] Foreign Application Priority Data

Feb. 23, 1996 [EP] European Pat. Off. .............. 96301235
Feb. 23, 1996 [GB] United Kingdom .................... 9603861

[51] Int. Cl.$^7$ ................................ G02B 6/28; G02B 6/32
[52] U.S. Cl. ............................ 359/435; 359/618; 385/24; 385/34
[58] Field of Search ..................... 359/435, 618, 359/619, 163; 385/24, 34; 250/208.2, 551; 364/822

[56] References Cited

U.S. PATENT DOCUMENTS

| | | | |
|---|---|---|---|
| 4,148,550 | 4/1979 | MacAnally | 359/435 |
| 4,470,407 | 9/1984 | Hussein | 600/108 |
| 5,218,654 | 6/1993 | Sauter | 385/24 |
| 5,245,680 | 9/1993 | Sauter . | |

FOREIGN PATENT DOCUMENTS

| | | |
|---|---|---|
| 0 658 786 | 6/1995 | European Pat. Off. . |
| 36 26 164 | 2/1987 | Germany . |
| 2 253 073 | 8/1992 | United Kingdom . |

*Primary Examiner*—Jon Henry
*Attorney, Agent, or Firm*—Nixon & Vanderhye P.C.

[57] ABSTRACT

An optical interconnect is formed form a series of coaxially aligned lenses. The lenses are spaced apart along a planar substrate and form repeated images of an optical array at the input to the interconnect. Outputs ports are located at different points along the interconnect. Each of the pair of lenses enclosing one of the repeated images is formed as a single physically integral member. This member may take the form of a transparent rod having spherical end surfaces. Each of the spherical end surfaces then provides one of the pair of lenses.

8 Claims, 6 Drawing Sheets

INPUT
8x8 LASER ARRAY
ON 125 μm PITCH
WITH 8° BEAMS
EMITTING AT 760 nm

OPTICAL INTERCONNECT

BACKGROUND OF THE INVENTION

1. Field of the Invention

The present invention relates to an optical interconnect system, and in particular to a backplane interconnect. Such an optical backplane might be used, for example, as a broadband interconnect for a multiprocessor computer system or in a switch for a broadband optical telecommunications system.

2. Related Art

A backplane interconnect system is typically required to provide many parallel data channels running across its width with access points at different locations along its length. Cards carrying interface and signal processing circuits may be fitted to the backplane at the different access points. When such an interconnect is used in a complex system, such as a switch in a telecommunications system, then it may have to accommodate a large number of cards. In these circumstances, if a conventional electrical backplane is used, then the limited bandwidth of the interconnect and crosstalk between different channels on the interconnect become significant factors in limiting the performance of the system. It has been recognised therefore that it would be desirable to provide an optical backplane to overcome these limitations.

It has previously been proposed to construct an optical backplane using laser arrays collimated by microlenses. This offers the required flexibility for the access points, but the channel packing density across the width of the card is limited by diffraction. This makes for inefficient use of the available area and causes the number of channels in a given cross section of the interconnect system to fall with increasing interconnect length. Diffraction can be overcome by using a single macrolens in place of an array of microlenses to collimate the laser array, but then the beams are no longer parallel to the axis and a large receiving lens is required to collect all the light. With a typical laser array [for example 8×8 devices, 125 $\mu$m pitch, 8° full beam width] and macrolenses with optimised focal lengths, connection densities are still lower than those achievable using microlenses.

An alternative approach is to use image relay systems to overcome the fall in connection density with distance. Certain optical systems may be concatenated to produce repeated images of an array while confining the beams within a constant envelope. Examples of such systems are disclosed in U.S. Pat. Nos. 5202567 and 5362961. The functioning of conventional image relay systems depends critically upon the accurate alignment of a large number of lenses. In the systems disclosed in the above-cited patents, this problem is addressed by forming the entire lens system integrally with an underlying glass substrate. This however makes the process of manufacture relatively complex, and tends moreover to limit the size to which the backplane can extend. U.S. Pat. No. 5,245,630, assigned to Unisys Corporation, discloses an optical interconnect which uses a series of coaxially aligned GRIN (graded refractive index) lenses interspersed with transmitter-receiver repeaters. The optical properties of the GRIN lenses are such that the relay can only function satisfactorily with on-axis images. Off-axis images suffer increasing divergence as the image passes down the relay. As a result, a separate series of lenses is required for each optical source, so that each source may be located on-axis. This has been found to limit unacceptably the connection density which can be achieved.

SUMMARY OF THE INVENTION

According to a first aspect to the present invention, there is provided an optical interconnect comprising:

a) an array of optical sources
b) and an image relay system comprising:
   i) a plurality of transparent rods which are coaxially aligned and which are spaced apart in the axial direction;
   ii) pairs of end surfaces formed on the said transparent rods, each of the said end surfaces configured as a converging lens and the said pair of end surfaces enclosing a respective one of a plurality of repeated images of the array of optical sources;
   iii) a plurality of optical access ports located at different points along the optical interconnect.

The present invention provides an optical backplane using an image relay system, in which each pair of lenses enclosing the image is combined into a single element. This single element is a rod lense which has spherical end surfaces configured as converging lenses. This fixes the relative positions of the lenses for which relative alignment is most critical, as well as reducing the overall number of components and the number of optical surfaces. At the same time, a single lens system is able to image an entire array of optical sources, by contrast with prior art systems in which a separate lens was required for each source. The array may be a linear array comprising a single row of optical sources, but more commonly would comprise a 2-dimensional array. In the preferred embodiment, the array of optical sources is provided by an integrated array of semiconductor lasers. Alternatively, the sources might comprise an array of optical fibres carrying optical signals originating elsewhere in an optical communications system. In this way, the present invention makes practical the construction of a robust high capacity optical backplane system potentially capable of carrying, for example, 5 Tbit/s of traffic, and without the problems of bandwidth limitation and crosstalk associated with conventional electrical interconnects.

Preferably the said single member comprises a transparent rod having end surfaces configured as converging lenses. Preferably the transparent rod is formed from glass having a refractive index greater than 1.5 and more preferably greater than 1.7.

The use of high index glass rods is found to reduce the spherical aberration of the image relay system, thereby allowing the maximum length of the system to be increased.

Preferably the optical access ports are located between the said members in regions where beams relayed by the system are generally collimated.

Some previous proposals for image relay systems suggest that access ports be located at the focus of the lenses. This however requires precise alignment of the port and the lenses within very narrow tolerances. The use in the present invention of access ports located away from the focus, at points where the relayed beams are collimated, ensures that the tolerances are relatively relaxed throughout the system. This has the important practical advantage that cards interfaced with the interconnect need be fitted with no greater accuracy than is required for conventional electrical backplane systems. A further advantage is that the access port can be configured so that cards can be added or taken away without interrupting the signal flow on the interconnect.

Preferably the optical access port for the optical input is located part way along the interconnect and includes a bi-directional coupler. The bi-directional coupler may comprise a beamsplitter with back reflector.

Preferably the interconnect includes a rigid substrate and at least one elongate cavity formed in the substrate for receiving and locating the plurality of coaxially aligned aligned lenses. Preferably the interconnect includes a plurality of parallel transmission paths, each of the paths comprising a plurality of coaxially aligned lenses, in which case the substrate will preferably have a corresponding array of parallel cavities, one for each line of lenses.

The system may include microlenses in addition to the rod lenses. The microlenses serve to reduce the effective numerical aperture of the light incident on the rod lenses, allowing the diameter of the rod lenses to be reduced.

The invention also encompasses an image relay- system, and an optical switch which incorporates the interconnect of the first aspect.

BRIEF DESCRIPTION OF THE DRAWINGS

Systems embodying the present invention will now be described in detail, by way of example only, and contrasted with the prior art, with reference to the accompanying drawings in which.

DETAILED DESCRIPTION OF EXEMPLARY EMBODIMENTS

Figure 2:
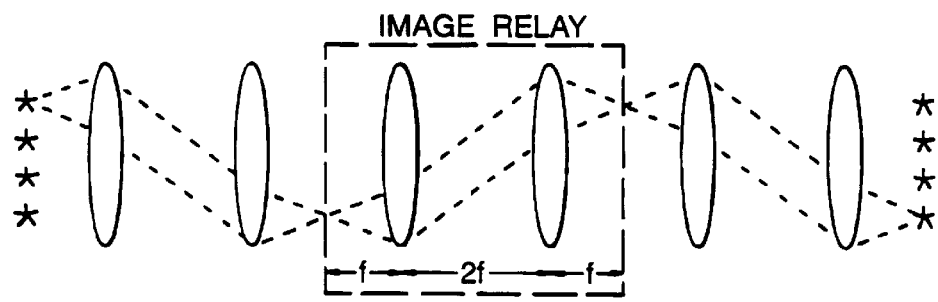
FIGS. 2 is a schematic of a 4f image relay system.
Figure 5:
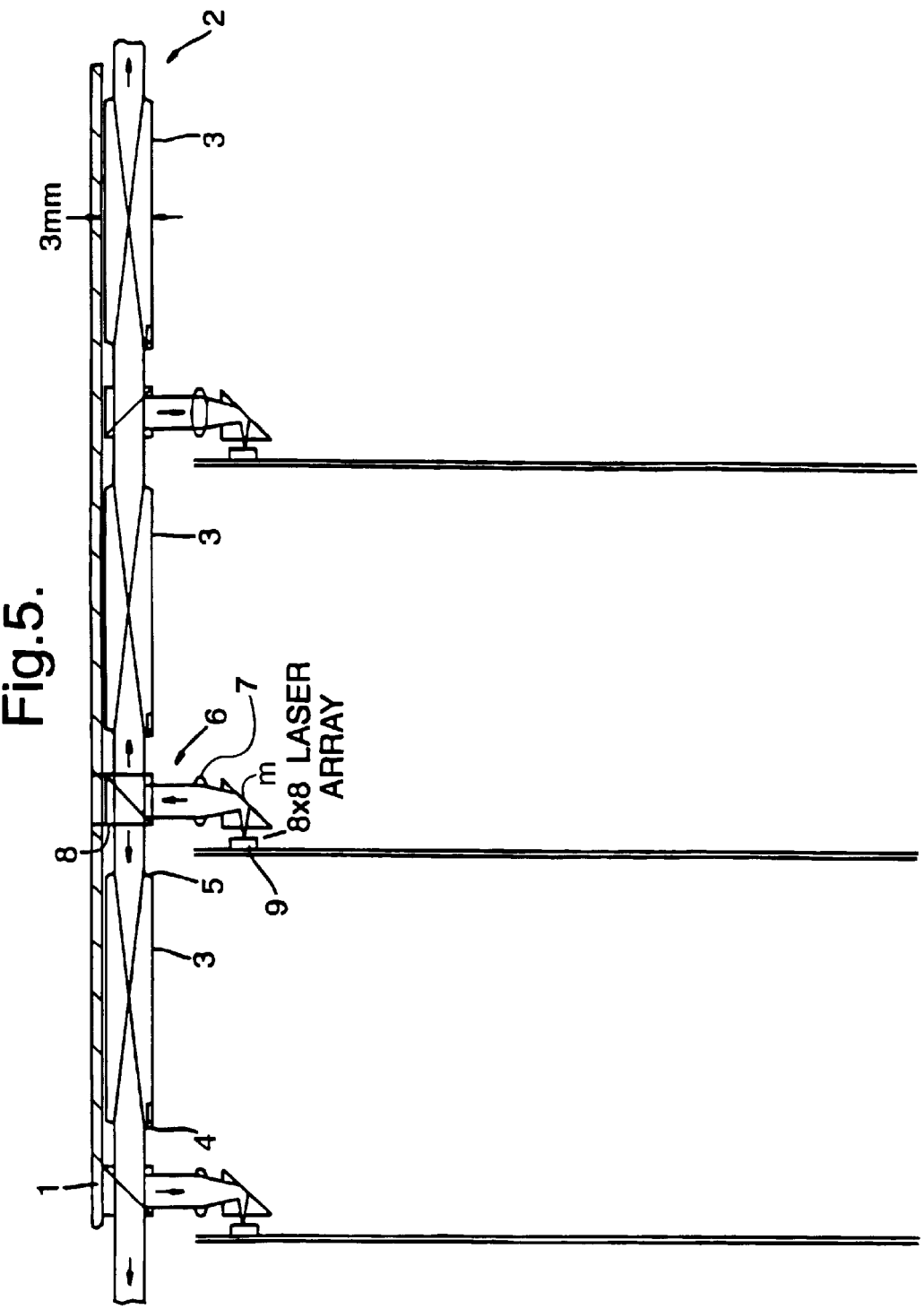
FIG. 5 is a schematic of an optical backplane embodying the present invention.

An optical interconnect system includes a substrate 1 (FIG. 5) and an optical image relay system 2 mounted on the substrate 1. The relay system comprises a number of glass rods 3. Each glass rod 3 has spherical end surfaces 4, 5. In the present example ten rods 3 are used, although for clarity four only of the rods are shown in FIG. 5. The rods act as a 4f system, so termed because the repeat unit of the optical system has a length equal to four times the focal length of the lenses, as in illustrated in FIG. 2. The discrete lens elements shown in FIG. 2 are replaced in the present embodiment by the spherical end surfaces of the rod 3.

Figure 9:
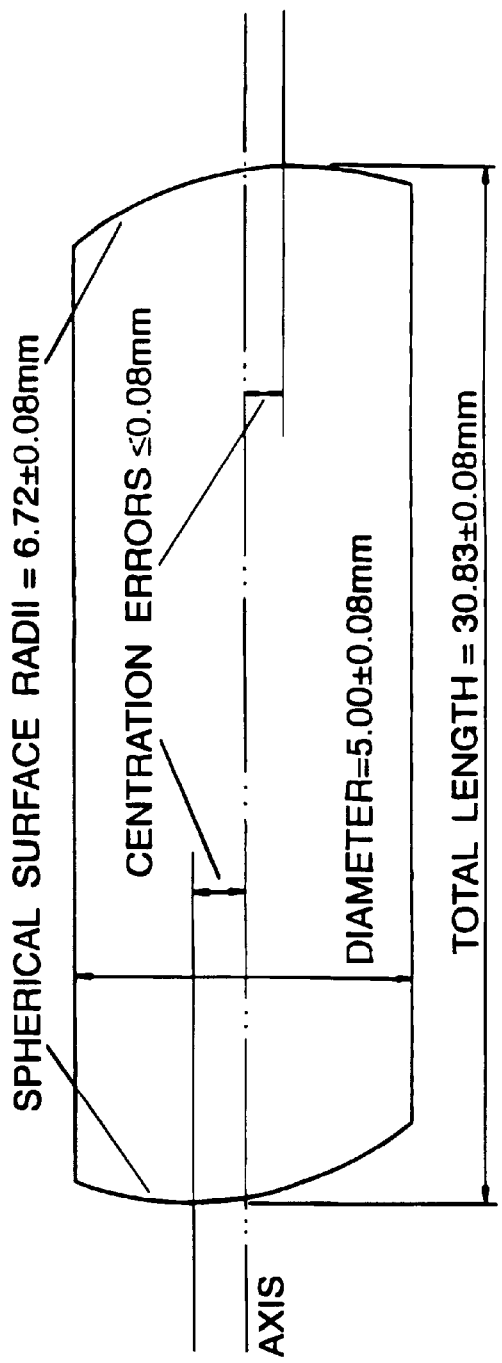
FIG. 9 is a diagram showing the profile of a rod lens.

FIG. 9 shows the profile of one of the glass rods 3. In this example, the rod is formed from SF11 glass manufactured by Schott and having a uniform refractive index of 1.767 at 760 nm. The length of the rod is 30.83±0.08 mm, the diameter is 5.00±0.08 mm and the centration errors are ≦0.08 mm. The end surfaces 4, 5 have spherical surface radii of 6.72±0.08 mm.

In a second, alternative example, each rod is formned from LaS F9 glass manufactured by Schott and having a refractive index n=1.8348 at 760 nm. The length of each rod is 31.17±0.1 mm. End surface radii are each 7.114±0.05 mm, rod diameter is 3.00±0.05 mm and centration is ±0.02 mm.

Optical signals for transmission through the interconnect are coupled to the optical system at an input port 6. This comprises a lens 7 mounted on the card and a beam splitter 8 with back reflector mounted on the backplane. The lens 7 in the input port and in the other access ports is formed from Schott BK7 glass and has a refractive index n =1.5116 at 760 nm. The lens centre thickness is 1.496 mm, surface radius is 13.976 mm and diameter is 3.00 mm. The optical axis of the beam splitter is aligned with the rods 3. The optical input to the system is provided by an 8×8 array of semiconductor laser diodes (SLDs). In this example, the SLDs are AlGaAs Vertical Cavity Surface Emitting Lasers (VCSELs). Arrays suitable for use in systems embodying the present invention are available commercially from Vixel Corporation, Broomfield, CO, USA. In use, the laser array 9 is mounted on a card within a rigid termination assembly which also houses the lens 7 and mirror M. The termination assembly is flexibly mounted on the card to provide a range of angular adjustment. The array 9 broadcasts data in both directions along the interconnect. In the regions between the rod lenses, where the beams are collimated, further beam splitters tap the optical data for reception on other cards.

Figure 6:
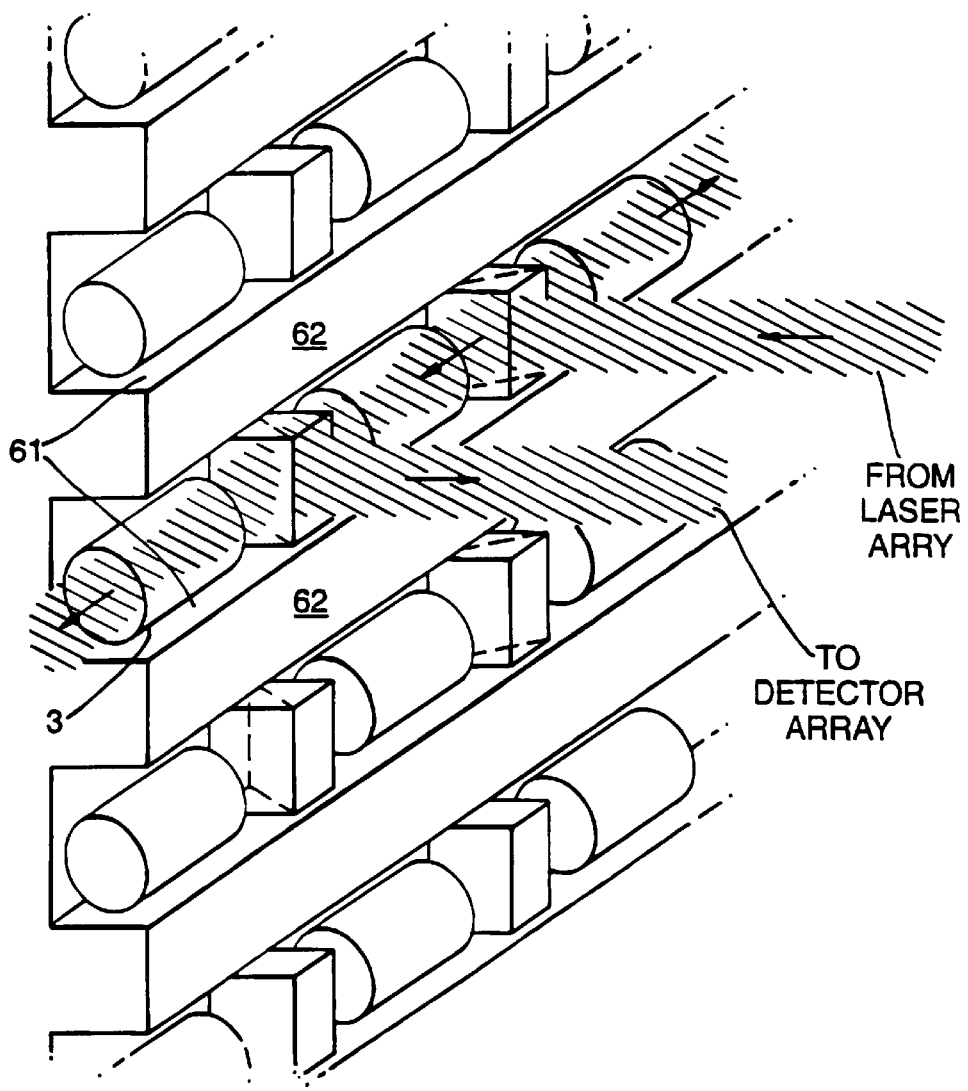
FIG. 6 is a perspective view of part of the backplane of FIG. 5.

As shown in FIG. 6, the rod lenses and beams splitters are located in channels 61 of a rigid substrate formed, for example, of steel. The ends of housings of the termination assemblies (omitted from FIG. 6 for clarity) may be arranged to abut the lands 62 between the channels to aid accurate angular alignment of the access ports with the backplane. The cards are supported in position by grooves on the inner surfaces of a surrounding housing, in the same manner as cards in conventional backplane systems.

Figure 10:
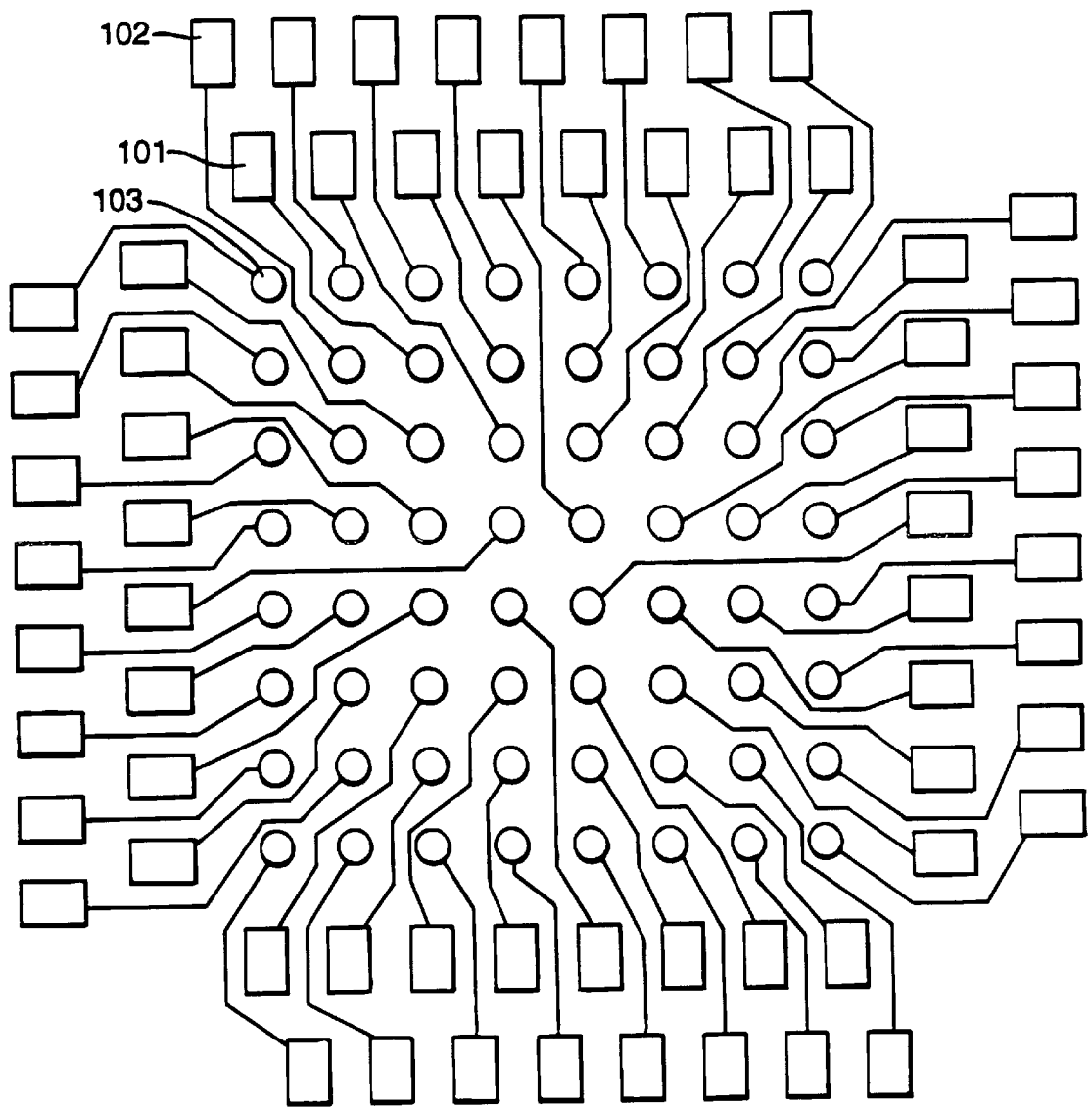
FIG. 10 is a plan view of a surface-emitting laser array.

The system illustrated is able to accommodate ten cards in addition to the card carrying the input laser array. In a similar fashion, the transmitters on the other cards may be broadcasting data on the parallel systems. If all the taps have the same reflectivities of 0.1, then the worst case splitter loss is an acceptable 18dB. This loss may be reduced by tailoring the tap reflectivities according to their position, and some taps may omitted if full connectivity-is not required. Although the system in this example has a one-to-many topology, a wide variety of different topologies may be used including, for example, a many-to-one topology in which case all but one of the cards has a laser array coupled to the interconnect via a respective access port, and one of the cards has a detector array. FIG. 10 shows the layout of the surface of the laser array. In the Figure, the contact pads are referenced 101, 102, and the emitting surfaces are referenced 103.

Figure 8:
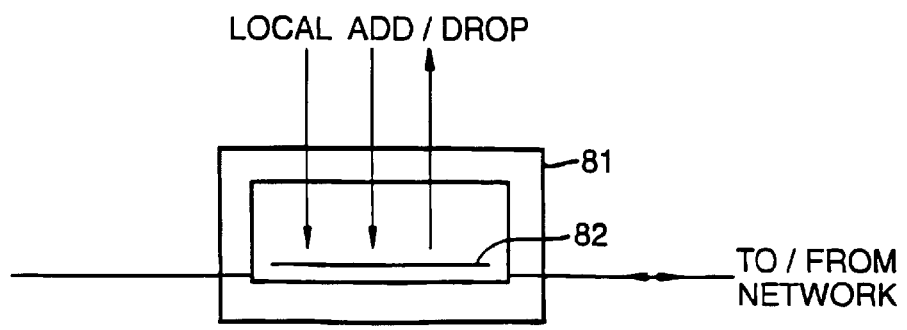
FIG. 8 is a schematic of a network switch incorporating the optical backplane.

With an 8×8 array of lasers modulated at 1 Gbit/s, each image relay system carries 64 Gbit/s. Since the diameter of the lens rods is only 3 mm, a backplane could readily accommodate, say, 80 systems, giving a total capacity of 5 Tbit/s. Higher capacities may be achieved using more densely packed arrays or narrower beam angles. Backplanes with this capacity, in conjunction with novel chip-to-chip interconnects, not only enable bigger switches to be built, but also give greater freedom to the switch designers. FIG. 8 shows schematically an example of a network switch 81 incorporating the optical backplane 82. The availability of spare interconnect capacity should reduce blocking probability and allow simpler architectures to be used. The high capacity of the interconnect also makes it suitable for use as part of the infrastructure of a multiprocessor computer system, in which case each of the cards may carry one or more microprocessors.

Figure 1:
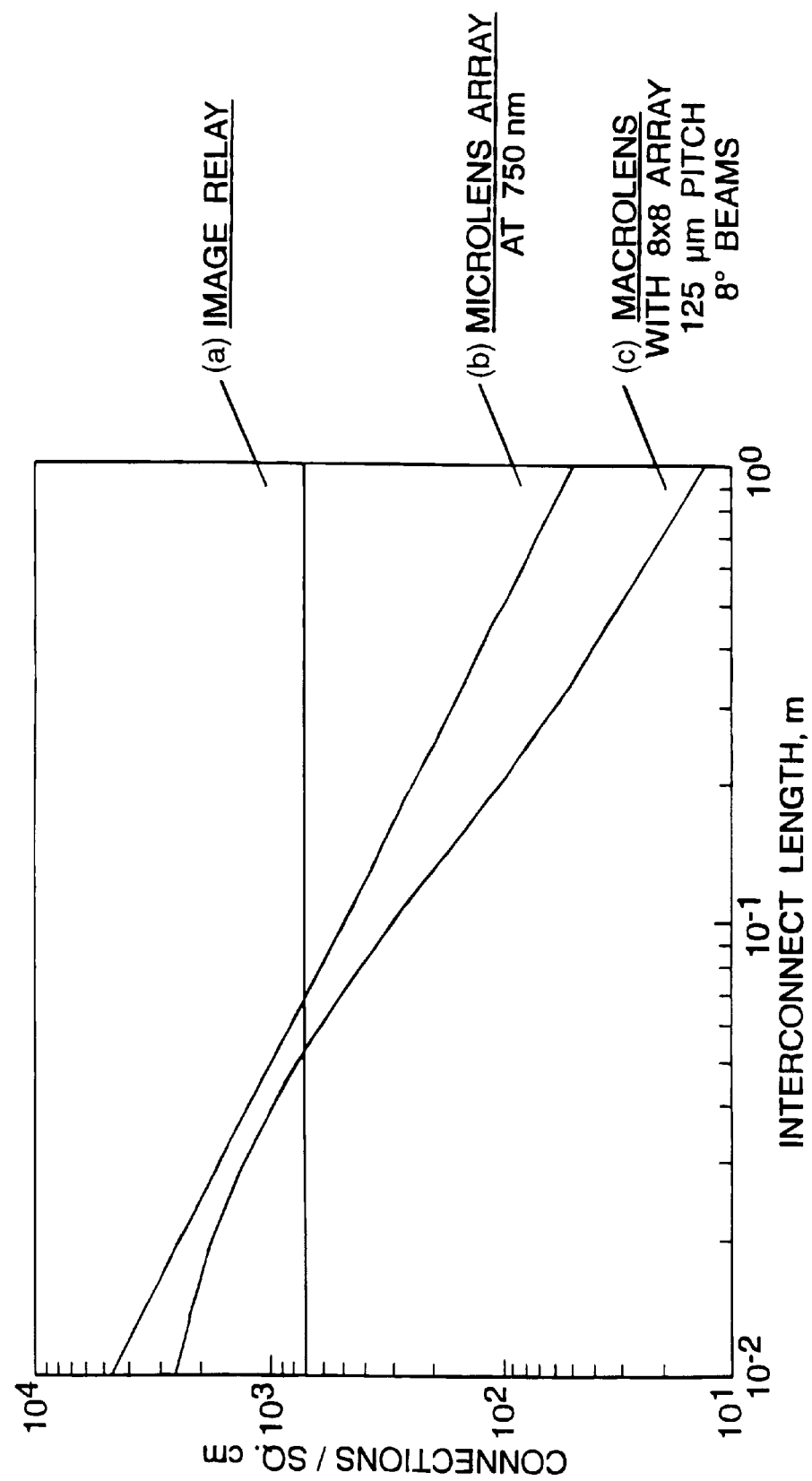
FIG. 1 is a graph of connection density as a function of interconnect length for a system embodying the present invention and for prior art systems.
Figure 3:
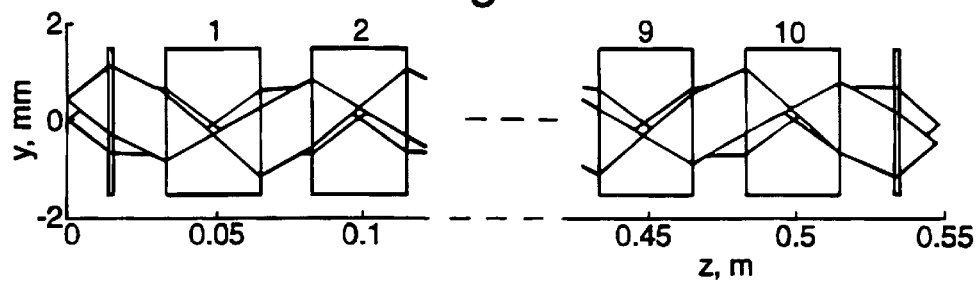
FIG. 3 is a ray trace through a system embodying the present invention.
Figure 4:
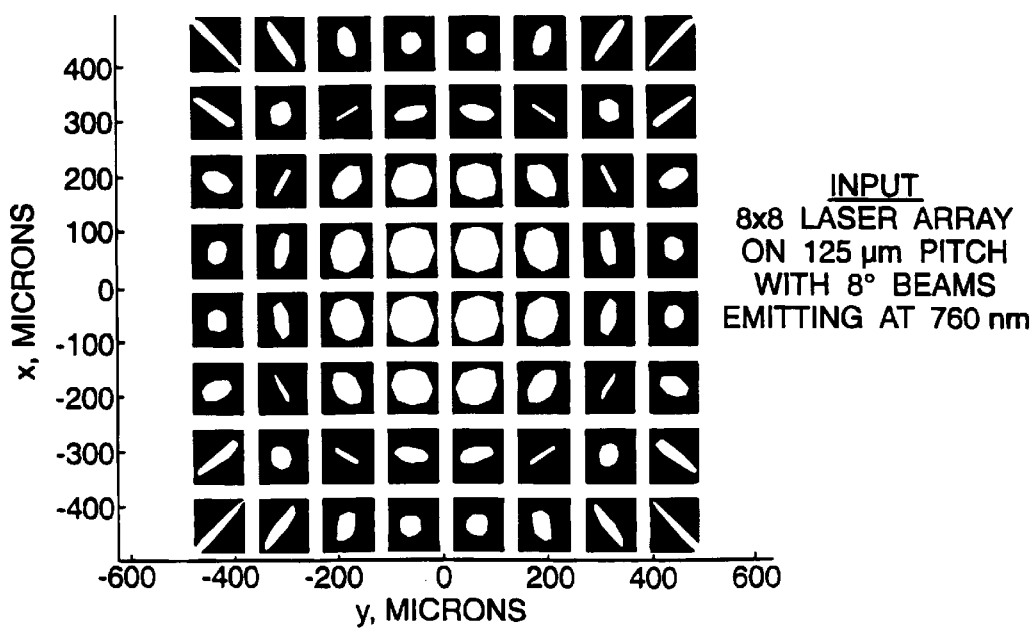
FIG. 4 is a plot of beam cross-sections in the final image plane for the system of FIG. 3.

As illustrated in FIG. 3, ray tracing from the laser array shows acceptable aberrations after transversing 10 identical relay sections over a distance of 0.5 m. The beams are confined to a diameter of less than 3 mm, giving an interconnect density of 700 channels/cm$^2$ independent of distance. This is shown in FIG. 1 as plot (c) and contrasted with the connection density of (a) a microlens array at 750 nm and (b) a macrolens system. The system embodying the present invention exceeds the capacity of collimated beam systems for ranges greater than 10 cm, which is the regime where the advantage of optical interconnection over electronic becomes marked.

Figure 7:
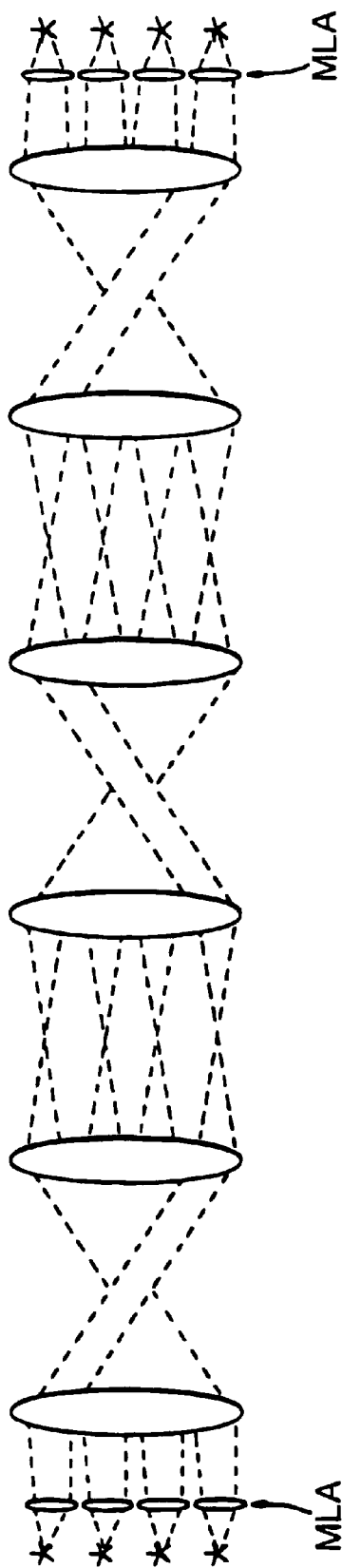
FIG. 7 is a schematic of a hybrid optical relay system.

It has previously been proposed to use hybrid microlens/macrolens systems. Such an approach may be used in a system embodying the present invention. As shown schematically in FIG. 7, 8×8 arrays of microlenses are positioned at the input and output of the image relay system, that is adjacent the laser array and detector array. This reduces the numerical aperture of the beams and allows the diameter of the rod lenses to be correspondingly reduced. The use of microlenses in hybrid systems with conventional macrolenses is described in "Parallel optical interconnections using surface-emitting microlasers and a hybrid imaging system", J. Jahns et al., Proceedings of the IEEE summer topical meeting on Smart Pixels, 1992, pp 71–72. Methods of manufacturing microlens arrays are described in "Fabrication, assessment and modelling of microlens arrays", F.A.P. Tooley et al., Proceedings of the IEEE summer topical meeting on Smart Pixels, 1992, pp 69–70.

What is claimed is:

1. An optical inconnect comprising:
   a) an array of optical sources, and
   b) an image relay system comprising:
      i) a plurality of transparent rods which are coaxially aligned and which are spaced apart in the axial direction;
      ii) pairs of end surfaces formed on the said transparent rods, each of the said end surfaces configured as a converging lens and the said pair of end surfaces on either end of a single respective rod enclosing a respective one of a plurality of repeated images of the array of optical sources; and
      iii) a plurality of optical access ports located at different points along the optical interconnect;
   in which the transparent rods are formed from glass having a refractive index greater than 1.7.

2. An interconnect as in claim 1 in which each of the optical access ports is located between respective ones of said rods in regions where beams relayed by the system are generally collimated.

3. An interconnect as in claim 1 in which an optical access port for an optical input is located part way along the interconnect and includes a bi-directional optical coupler.

4. An interconnect as in claim 3, in which the bi-directional coupler comprises a beam splitter including a back reflector facing an incoming optical signal.

5. An interconnect as in claim 1 including a rigid substrate and at least one elongate cavity formed in the substrate for receiving and locating the plurality of coaxially aligned rods.

6. An interconnect as in claim 1 including a plurality of parallel transmission paths, each of the paths comprising a plurality of coaxially aligned rods.

7. An optical interconnect comprising:
   a) an array of optical sources, and
   b) an image relay system comprising:
      i) a plurality of transparent rods which are coaxially aligned and which are spaced apart in the axial direction;
      ii) pairs of end surfaces formed on the said transparent rods, each of the said end surface configured as a converging lens and the said pair of end surfaces on either end of a single respective rod enclosing a respective one of a plurality of repeated images of the array of optical sources; and
      iii) a plurality of optical access ports located at different points along the optical interconnect; and
   microlenses located between an optical input to the interconnect and adjacent one of said rods and arranged to reduce the effective numerical aperture of beams incident on the said adjacent rod.

8. A switch for a broadband network including an interconnect as in claim 1.

* * * * *